United States Patent [19]

Pannone et al.

[11] 4,135,857

[45] Jan. 23, 1979

[54] REDUCED DRAG AIRFOIL PLATFORMS

[75] Inventors: John L. Pannone, Glastonbury; Fritz K. Smakula, Lebanon, both of Conn.

[73] Assignee: United Technologies Corporation, Hartford, Conn.

[21] Appl. No.: 805,219

[22] Filed: Jun. 9, 1977

[51] Int. Cl.² ............................................. F01D 5/30
[52] U.S. Cl. ............................ 416/193 A; 416/219 R; 416/234; 416/244 A; 416/248
[58] Field of Search ................. 416/2, 193 A, 212 A, 416/219 R, 220 R, 234, 248, 244 A; 415/DIG. 1

[56] References Cited

U.S. PATENT DOCUMENTS

| 1,304,793 | 5/1919 | Moore | 416/219 |
| 1,793,468 | 2/1931 | Densmore | 416/219 |
| 2,398,140 | 4/1946 | Heppner | 416/193 A X |
| 2,642,263 | 6/1953 | Thorp | 416/248 X |
| 2,873,947 | 2/1959 | Perry | 416/219 X |
| 2,918,254 | 12/1959 | Hausammann | 416/234 A X |
| 3,923,420 | 12/1975 | Chifos | 416/193 A X |

FOREIGN PATENT DOCUMENTS

| 496213 | 10/1919 | France | 416/193 A |
| 996967 | 12/1951 | France | 416/234 |
| 229266 | 10/1943 | Switzerland | 416/234 |

*Primary Examiner*—Everette A. Powell, Jr.
*Attorney, Agent, or Firm*—Gene D. Fleischhauer

[57] ABSTRACT

A flow directing apparatus for use in an axial flow turbomachine is disclosed. Techniques for reducing aerodynamic drag along the walls of the flow directing apparatus are developed. In one embodiment, rotor blades have multiplanar platform surfaces which reduce aerodynamic drag pressure losses at the interface between each blade platform and the adjacent structure.

17 Claims, 3 Drawing Figures

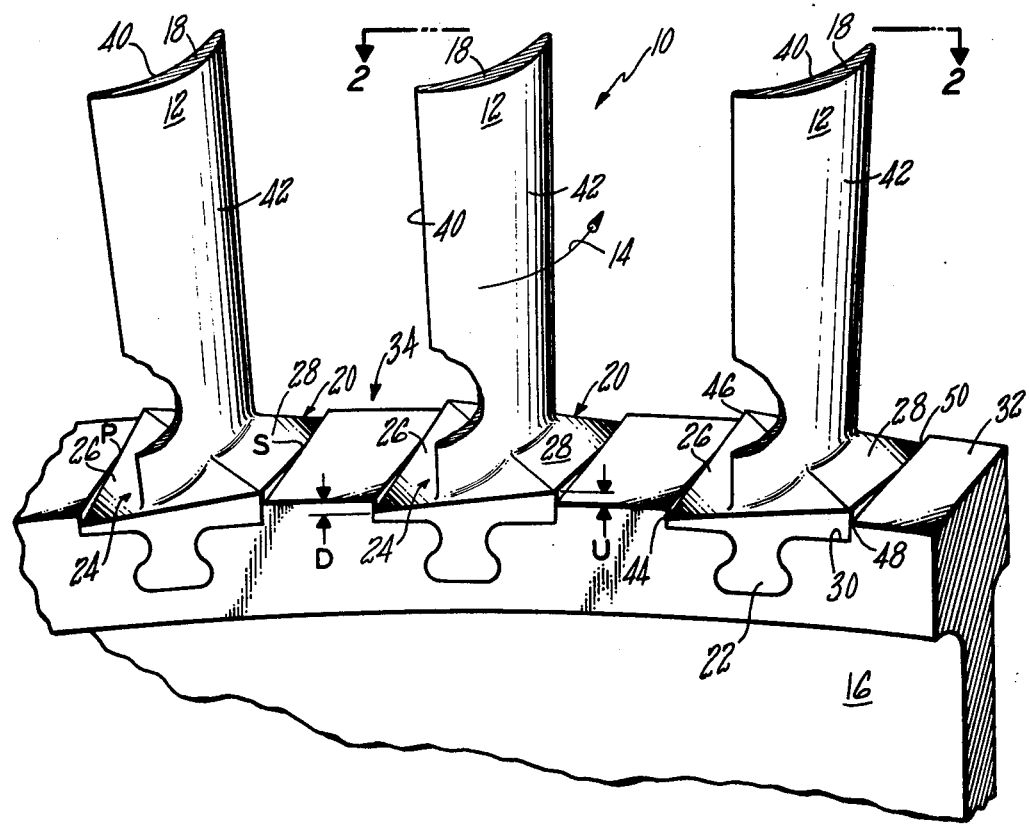
FIG. 1
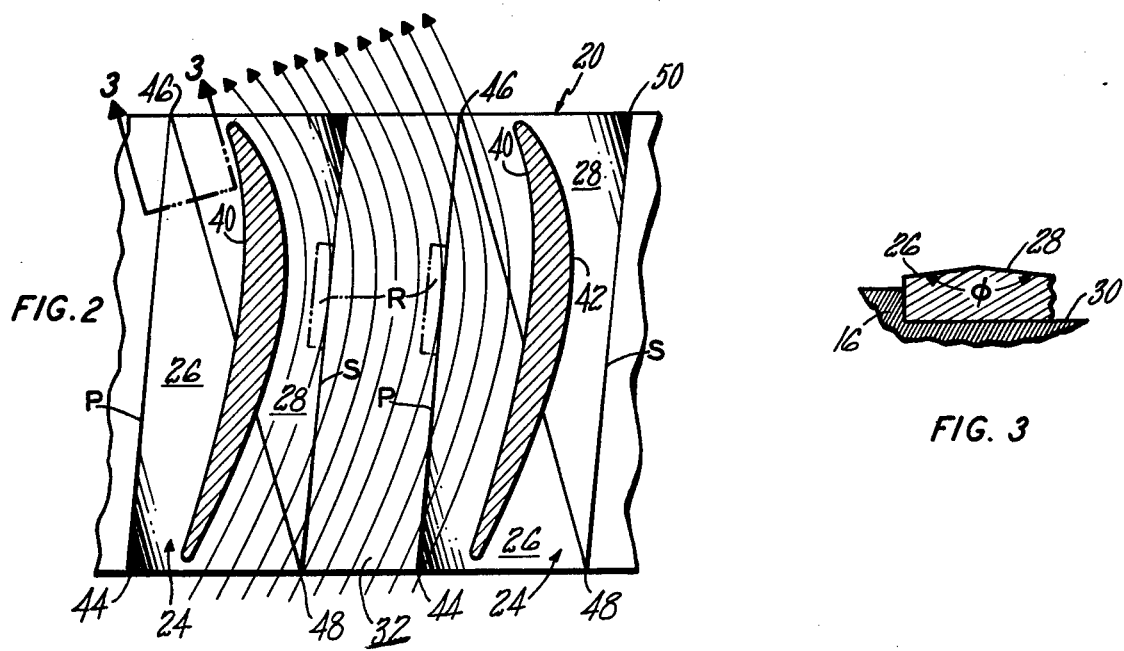
FIG. 2
FIG. 3

REDUCED DRAG AIRFOIL PLATFORMS

BACKGROUND OF THE INVENTION

1. Field of the Invention

This invention relates to axial flow rotary machines and, more specifically, to the reduction of flow path pressure losses in rotary machines.

2. Description of the Prior Art

A rotary machine of the type described above has a working medium flow path extending axially through the machine. The flow path has an inner wall and an outer wall. In the typical prior art constructions, rows of stator vanes extend radially inwardly from the outer wall; rows of rotor blades extend radially outwardly from the inner wall. Each stator vane conventionally has a platform which combines with the adjacent structure to form a portion of the outer flow path wall. Each rotor blade conventionally has a platform which combined with the adjacent structure to form a portion of the inner flow path wall. During operation of the machine, the working medium flows axially between alternate rows of vanes and blades.

Aerodynamically smooth or continuous flow path walls are desired. Stator vane and rotor blade platforms in known prior art constructions join evenly together with the adjacent structure to form the flow path wall. Examples of known constructions are shown in: U.S. Pat. No. 2,663,494 to Keast entitled "Blading For Compressors, Turbines, and The Like"; U.S. Pat. No. 3,902,824 to Sauer entitled "Blade Lock"; and U.S. Pat. No. 3,904,317 to Cardin et al. entitled "Bucket Locking Mechanism". Although the flow path walls of the prior art constructions are shown as smooth continuous surfaces, manufacturing tolerances on platform surfaces and on the surfaces of contiguous components cause discontinuities along the flow path. The flow path discontinuities impose drag pressure losses on the flowing medium and decreased machine efficiency results.

A dramatic increase in the need to produce energy efficient machines has taken place in recent years because of increased fuel costs and limited fuel supplies. As a result, research efforts are being directed toward improving the aerodynamic efficiency of axial flow rotary machines.

SUMMARY OF THE INVENTION

A primary aim of the present invention is to improve the aerodynamic efficiency of an axial flow rotary machine. A decrease in drag pressure losses is sought, and a specific goal is to reduce losses at surface discontinuities between adjacent elements of the flow path wall.

According to the present invention, the platforms of machine blades and vanes have multiplanar surfaces adapted to reduce the average aerodynamic drag at discontinuities between the platform surfaces and the adjacent surfaces of abutting components.

A primary feature of the present invention is the multiplanar platform surface. In one embodiment, the platform surface is angled with respect to the adjacent surface of the abutting component. In a biplanar embodiment, the two planes of the platform surface intersect at an angle $\Phi$.

A principal advantage of the present invention is reduced aerodynamic drag at surface discontinuities between the platform surfaces of blades or vanes and the adjacent surfaces of abutting components. Increased operating efficiency and improved machine performance are a result.

The foregoing, and other objects, features and advantages of the present invention will become more apparent in the light of the following detailed description of the preferred embodiment thereof as shown in the accompanying drawing.

BRIEF DESCRIPTION OF THE DRAWING

FIG. 1 is a simplified perspective view of a portion of the rotor assembly of a gas turbine engine;

FIG. 2 is a directional view taken along the line 2—2 shown in FIG. 1; and

FIG. 3 is a sectional view taken along the line 3—3 as shown in FIG. 2.

DESCRIPTION OF THE PREFERRED EMBODIMENT

A gas turbine engine embodiment of a rotary machine is illustrated in the FIG. 1 partial perspective view.

A portion of a flow directing assembly such as the rotor assembly 10 of the engine is shown. The rotor assembly includes a plurality of rotor blades 12 which extend into the working medium flow path 14 from a rotor disk 16. Each blade has an airfoil section 18, a platform section 20 and a root section 22. The platform section has an outwardly facing surface 24 formed of a first planar surface 26 and a second planar surface 28. The root section of each blade engages a correspondingly shaped slot 30 in the disk. The disk has an outwardly facing surface 32 which extends between each pair of adjacent slots. The surfaces 32 of the disk and the platform surfaces 24 of the blades are wall segments cooperatively forming a portion 34 of the inner wall of the working medium flow path 14.

As illustrated in FIG. 2, each blade 12 has a pressure side 40 and a suction side 42. The platform surface 24 of each blade has an upstream pressure side corner 44; a downstream pressure side corner 46; an upstream suction side corner 48; and a downstream suction side corner 50. Each first planar surface 26 passes through the upstream pressure side corner 44, the downstream pressure side corner 46 and the upstream suction side corner 48 of the corresponding platform surface. Each second planar surface 28 passes through the upstream suction side corner 48, the downstream suction side corner 50 and the downstream pressure side corner 46 of the corresponding platform surface.

As illustrated in FIG. 3, the angle of intersection between each first planar surface 26 and the corresponding second planar surface 28 is the angle $\Phi$. The included angle $\Phi$ is less than one hundred eighty degrees (180°).

Returning to FIG. 2, between each first planar surface 26 and the adjacent disk surface 32 is a pressure side interface P. Between each second planar surface 28 and the adjacent disk surface 32 is a suction side interface S. Each upstream suction side corner 48 is offset from the adjacent disk surface by the distance U and each downstream suction side corner 50 is offset from the adjacent disk surface by the distance D. Each upstream pressure side corner 44 is offset from the adjacent disk surface by the distance D and each downstream suction side corner 46 is offset from the adjacent disk surface by the distance U.

During operation of the axial flow turbomachine illustrated, the rotor blades 12 redirect the working medium. Surface discontinuities at the pressure side interface P and the suction side interface S impose drag pressure losses on the working medium flow. In the regions of parallel flow R, the medium does not cross an interface and the drag pressure loss is negligible. The drag losses are significant along the interfaces on either side of the regions of parallel flow R where the flow crosses a discontinuity.

The working medium encounters a dam when the flow takes a step-up at an interface and encounters a waterfall when the flow takes a step-down at an interface. Because the drag coefficient for a dam is twice the drag coefficient for a waterfall, it is aerodynamically more efficient to direct the flow over a waterfall rather than to direct the flow over a dam of equivalent size.

As shown in FIGS. 1 and 2, at each suction side interface S the working medium flowing from the platform surface 24 to the disk surface 32 passes over a first waterfall at the upstream end of the interface and a second waterfall at the downstream end of the interface. At the upstream corner of the platform, the working medium falls a distance U over the first waterfall. At the downstream corner of the platform, the working medium falls a distance D over the second waterfall. The double waterfall construction biases any discontinuity at the interface towards a waterfall in lieu of a dam. In terms of performance, a penalty at a step-up is traded for a lesser penalty at a step-down.

Manufacturing tolerances inherently introduce some deviation from the nominal condition illustrated. For example, at the S interface when the disk surface is at its most positive tolerance, the disk surface is raised with respect to the illustrated position. The flow encounters a dam decreased by the distance U at the upstream corner of the interface and a waterfall increased by the distance D at the downstream corner of the interface. Those skilled in the art will recognize that this beneficial relationship results in an overall reduction in drag pressure losses when the offsets D and U are applied to all manufacturing tolerance variations of the components involved.

The magnitude of any waterfall is determined by comparing the position of the platform surface with the position of the disk surface. Similarly, the magnitude of any dam is determined by comparing the position of the platform surface with the position of the disk surface. For flow passing from the disk surface to the platform surface, the maximum waterfall (step-down) occurs when the disk is at its most positive tolerance and the platform is at its most negative tolerance; the maximum dam (step-up) occurs when the disk is at its most negative tolerance and the platform is at its most positive tolerance. For flow passing from the platform surface to the disk surface the maximum waterfall (step-down) occurs when the platform surface is at its most positive tolerance and the disk surface is at its most negative tolerance; the maximum dam (step-up) occurs when the platform surface is at its most negative tolerance and the disk surface is at its most positive tolerance.

As illustrated in FIG. 2, the crossover point between the platform surface and the disk surface falls in the region of parallel flow. If the crossover point falls outside the region of parallel flow, the flow will encounter a dam over a portion of the interface where before the flow encountered a waterfall. Preferred relative magnitudes of the offset D and the offset U are chosen to keep the crossover point within the region of parallel flow.

The offsets are calculable through use of the formulas given below. The offset at the upstream suction side corner 48 and downstream pressure side corner 46 is U. The offset at the downstream suction side corner 50 and the upstream pressure side corner 44 is D. All tolerances and offsets are measured with respect to the untoleranced plane of the disk. The offset formulas are $$U = \frac{C \cdot |M| - |L|}{C + 1} \text{ and}$$

$$D = \frac{|M| - C \cdot |L|}{C + 1}$$

where M is the difference between the most negative manufacturing tolerance on the platform surface and the most positive manufacturing tolerance on the disk;

L is the difference between the most positive manufacturing platform surface tolerance and the most negative manufacturing disk surface tolerance; and C is the desired ratio at the corners of the maximum waterfall to the maximum dam.

The offset at the corners is selected to cause a corner step-down (waterfall) that is twice the maximum step-up (dam) at the extreme of the tolerances. Accordingly, the offset causes the drag pressure loss at the corners to be the same for the maximum dam and the maximum waterfall. When M is equal to L and C is equal to 2.0, each crossover point is at the midpoint of the respective interface and is within the region of parallel flow R. However, each C greater than one biases any discontinuity at the interface towards a waterfall in lieu of a dam.

The angle $\Phi$ is calculable from the offset U and the offset D. FIG. 3 illustrates the relationship between the angle $\Phi$, first planar surface 26 and second planar surface 28. Angles of $\Phi$ within the range of one hundred seventy-one degrees (171°) to one hundred seventy-eight and five tenths degrees (178.5°) are preferred with the precise angle depending upon the physical relationships of the platform elements.

Those skilled in the art will recognize the platform surface may be formed of more than two planes. In an alternate embodiment, the adjacent disk surfaces may be angled to achieve the preferred offset.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a rotary machine of the type having an axially extending working medium flow path bounded by a plurality of circumferentially adjacent wall segments, wherein one or more of the wall segments has an airfoil section extending radially therefrom for directing the flowing medium and wherein each of the airfoil bearing segments has a platform surface with an upstream suction side corner, a downstream suction side corner, a downstream pressure side corner and an upstream pressure side corner, the improvement wherein each of said platform surfaces is formed of a first planar surface passing through the upstream suction side corner, the downstream pressure side corner and the downstream suction side corner, a second planar surface passing through the upstream pressure side corner, the downstream pressure side corner and the upstream suction side corner, said first planar surface intersecting said second planar surface at an included angle within the range of one hundred seventy-one degrees (171°) to one hundred seventy-eight and five tenths degrees (178.5°).

2. A flow directing assembly for a rotary machine of the type having a working medium flow path extending axially therethrough, which comprises:
a plurality of circumferentially adjacent wall segments, wherein one or more of the segments has
an airfoil section extending radially into the working medium flow path for directing the flowing medium, and
a platform section bounding the flow path including
a pressure side corner at the downstream end of the flow opposing surface
a suction side corner at the upstream end of the platform surface
wherein said suction and pressure side corners are raised with respect to the immediately adjacent wall segment.

3. The invention according to claim 2, wherein each of said platform surfaces further has
a pressure side corner at the upstream end of the wall segment
a suction side corner at the downstream end of the wall segment
wherein said downstream suction and upstream pressure side corners are recessed from the immediately adjacent wall segment.

4. For a gas turbine engine having a working medium flow path extending axially through the engine, a rotor assembly comprising:
a disk having a plurality of circumferentially spaced slots at the outer periphery of the disk and having an outwardly facing disk surface extending between each pair of adjacent slots; and a plurality of blades each having
a root section which engages a corresponding slot in the disk,
an airfoil section extending radially outwardly from the root section into the flow path of the working medium, and a platform section having a outwardly facing platform surface extending between each pair of adjacent disk surfaces to form a portion of the inner wall of the working medium flow path, the platform surface having
a pressure side corner at the upstream end of the platform surface and
a suction side corner at the downstream end of the platform surface, wherein said suction and pressure side corners are recessed from the adjacent outwardly facing disk surface.

5. The invention according to claim 4 wherein the platform surface of each blade further has
a pressure side corner at the downstream end of the platform surface and
a suction side corner at the upstream end of the platform surface,
wherein the pressure side corner and the suction corner are raised with respect to the correspondingly adjacent surface of said disk.

6. The invention according to claim 5 wherein the platform surface of each blade is formed of a first planar surface passing through the upstream suction side corner, the downstream pressure side corner, and the downstream suction side corner and
a second planar surface passing through the upstream pressure side corner, the downstream pressure side corner, and the upstream suction side corner.

7. The invention according to claim 6 wherein the included angle of intersection between the first planar surface and the second planar surface is within the range of one hundred seventy-one degrees (171°) to one hundred seventy-eight and five tenths degrees (178.5°).

8. The invention according to claim 7 wherein the included angle of intersection between the first planar surface and the second planar surface is approximately one hundred seventy-five degrees (175°).

9. A rotor blade having a platform surface including an upstream pressure side corner, a downstream pressure side corner, an upstream suction side corner and a downstream suction side corner wherein the surface is formed of a first planar surface passing through the upstream suction side corner, the downstream pressure side corner and the downstream suction side corner and a second planar surface passing through the upstream pressure side corner, the downstream pressure side corner and the upstream suction side corner, said second planar surface intersecting said first planar surface at an included angle within the range of one hundred seventy-one degrees (171°) to one hundred seventy-eight and five tenths degrees (178.5°).

10. A gas turbine engine rotor blade having an airfoil section extending into a working medium flow path with an outwardly facing blade platform surface attached to the airfoil base, said platform surface including an upstream pressure side corner, a downstream pressure side corner, an upstream suction side corner and a downstream suction side corner wherein said platform surface is formed of a first planar surface passing through the upstream suction side corner, the downstream pressure side corner and the downstream suction side corner, a second planar surface passing through the upstream pressure side corner, the downstream pressure side corner and the upstream suction side corner, and said first planar surface intersects said second planar surface at an angle approximately equal to one hundred seventy-five degrees (175°).

11. The invention according to claim 4 wherein the platform surface of each blade is formed of at least two intersecting planar surfaces.

12. The invention according to claim 4 wherein the upstream pressure side corner of each platform surface and the downstream suction side corner of each platform surface are recessed by the distance | D | which is calculable according to the formula $$|D| = \frac{|M| - C \cdot |L|}{C + 1}$$

where M is the difference between the most negative manufacturing tolerance on the platform surface and the most positive manufacturing tolerance on the disk;

L is the difference between the most positive platform surface tolerance and the most negative disk surface tolerance, and C is the desired ratio at the corners of the maximum waterfall to the maximum dam.

13. The invention according to claim 12 wherein the ratio C is approximately equal to two.

14. For a gas turbine engine having a working medium flow path extending axially through the engine, a rotor assembly comprising:
a disk having
a plurality of circumferentially spaced slots at the outer periphery of the disk and
an outwardly facing disk surface extending between each pair of adjacent slots; and a plurality of blades each having
a root section which engages a corresponding slot in the disk,
an airfoil section extending radially outwardly from the root section into the flow path of the working medium, and
a platform section having an outwardly facing platform surface extending between each pair of adjacent disk surfaces to form a portion of the inner wall of the working medium flow path, the platform surface having
a pressure side corner at the downstream end of the platform surface and
a suction side corner at the upstream end of the platform surface, wherein said suction and pressure side corners are raised with respect to the adjacent outwardly facing disk surface.

15. The invention according to claim 14 wherein the upstream suction side corner of the platform surface and the downstream pressure side corner of the platform surface are raised by the distance $|U|$ which is calculable according to the formula $$|U| = \frac{C \cdot |M| - |L|}{C + 1}$$

where M is the difference between the most negative manufacturing tolerance on the platform surface and the most positive manufacturing tolerance on the disk;
L is the difference between the most positive platform surface tolerance and the most negative disk surface tolerance, and C is the desired ratio at the corners of the maximum waterfall to the maximum dam.

16. The invention according to claim 15 wherein the ratio C is approximately equal to two.

17. The invention according to claim 5 wherein the platform surface of each blade is formed of at least two intersecting planar surfaces.

* * * * *